Patented June 8, 1937

2,083,216

UNITED STATES PATENT OFFICE 2,083,216

MONOAZO DYES

Walther Benade, Dessau in Anhalt, Erich Fischer, Bad Soden in Taunus, and Max Raeck, Dessau in Anhalt, Germany, assignors to General Aniline Works, Inc., New York, N. Y., a corporation of Delaware No Drawing. Application June 15, 1935, Serial No. 26,774. In Germany June 20, 1934

7 Claims. (Cl. 260—44.6)

Our present invention relates to new monoazo dyes and to a process for manufacturing the same.

More particularly it relates to new azo dyes which dye wool yellow to red tints and which show when carrying out the dyeing operation in the presence of a chromium mordant or when afterchroming the dyeings obtained, a particularly high fastness to the action of light.

These new dyes correspond to the general formula

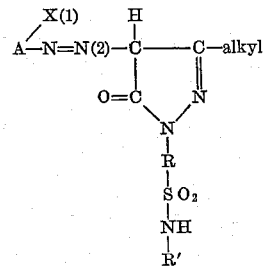

in which X is OH or COOH, A is a radicle of the benzene series, R and R' are unsulfonated, but, if desired, otherwise substituted radicles of the benzene series, one of these radicles bearing a COOH group.

Besides their fastness to light these dyes show an outstandingly good affinity to the wool fiber which surpasses that of similar known dyes derived from 1-aryl-3-alkyl-5-pyrazolones. The greater part of these dyes and especially those containing no sulfonic acid radicle in the diazo component, can be dyed according to the single bath process in the presence of a chromium mordant. On this account, we prefer to elect diazo components bearing no sulfonic acid radicles.

The following examples serve to illustrate our invention, the parts being by weight:—

*Example 1.*—168 parts of 6-nitro-2-amino-4-methyl-1-hydroxybenzene are diazotized in the usual manner and the diazo compound is introduced into a solution of 407.5 parts of a pyrazolone of the formula

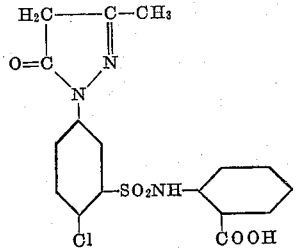

said solution containing sodium carbonate in excess. When coupling has finished, the dye is filtered by suction and dried. . It is easily soluble in water and dyes wool, when dyed according to the single bath chromium dyeing process, red tints of good fastness.

Similar dyes are obtainable when substituting for the pyrazolone mentioned above, one of the following pyrazolones:

1(4'-chlorophenyl-3'-sulfanilido-3''-carboxylic acid)-3-methyl-5-pyrazolone of the formula

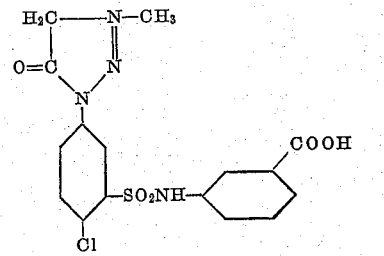

or the corresponding 4''-carboxylic acid.

*Example 2.*—373 parts of 1(phenyl-3'-sulfanilido-2''-carboxylic acid) 3-methyl-5-pyrazolone of the formula

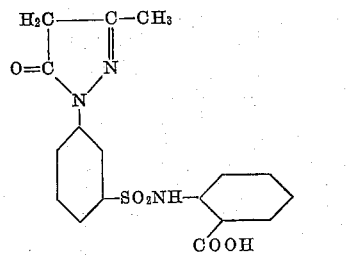

are dissolved in water in the presence of sodium carbonate in excess. Into this solution a suspension of the diazo compound prepared from 154 parts of 5-nitro-2-amino-1-hydroxybenzene is introduced. The mixture is stirred for some hours, filtered with suction and dried. The dye thus obtained dyes on wool according to the single bath chromium process red tints which are somewhat more bluish than those produced with the dye according to Example 1.

*Example 3.*—When substituting in Example 1 the 6-nitro-2-amino-4-methyl-1-hydroxybenzene by 4-nitro-2-amino-6-methyl-1-hydroxybenzene, a dye of similar properties is obtained, dyeing, however, tints which are essentially more yellowish.

Similar dyes are obtainable when using as diazo component one of the following orthohydroxyamines: 6-chloro-4-nitro-2-amino-1-hydroxybenzene, 6-nitro-4-chloro-2-amino-1-hydroxybenzene, 4-chloro-2-amino-1-hydroxy-benzene.

*Example 4.*—240 parts of trichloroanthranilic acid are diazotized and coupled in a soda alkaline solution with 410 parts of the pyrazolone of the formula

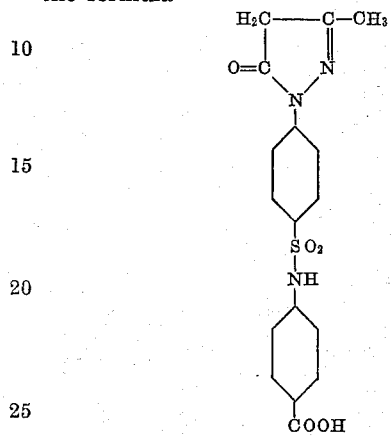

The dye formed is worked up in the known manner; it dyes wool according to the single bath chromium dyeing process greenish yellow tints of an excellent fastness.

*Example 5.*—171.5 parts of 3-chloro-2-amino-benzene-1-carboxylic acid are diazotized and united with a solution containing sodium carbonate and 466 parts of a pyrazolone of the formula

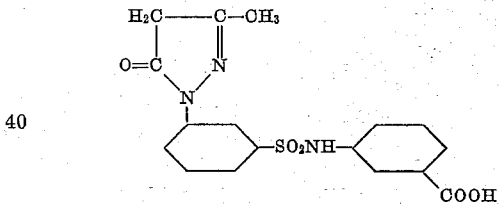

The dye thus obtained dyes on wool in the presence of a chromium mordant yellow tints.

*Example 6.*—137 parts of 2-aminobenzene-1-carboxylic acid are diazotized and coupled in a soda alkaline solution with 466 parts of a pyrazolone of the following formula

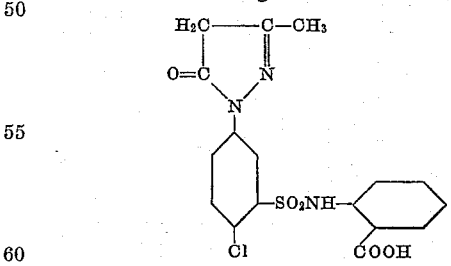

The dye thus obtained dyes on wool reddish yellow tints of an excellent fastness.

What we claim is:—

1. The new dyes corresponding to the general formula

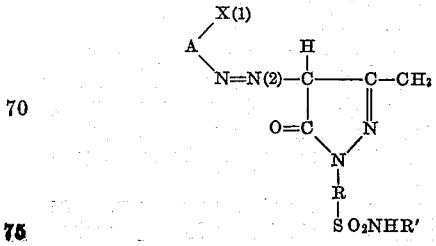

in which A is a radicle of the benzene series, X is a member of the group consisting of OH and —COOH and R and R' each stand for an unsulfonated benzene radicle, one of which is substituted by a COOH-group, said dyes dyeing wool in the presence of a chromium mordant yellow to red tints of good fastness.

2. The new dyes corresponding to the general formula

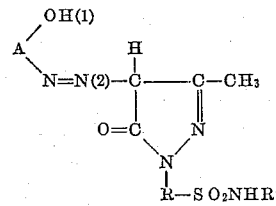

in which A is a radicle of the benzene series and R and R' each stand for an unsulfonated benzene radicle, one of which is substituted by a COOH-group, said dyes dyeing wool in the presence of a chromium mordant orange to red tints of good fastness.

3. The new dyes corresponding to the general formula

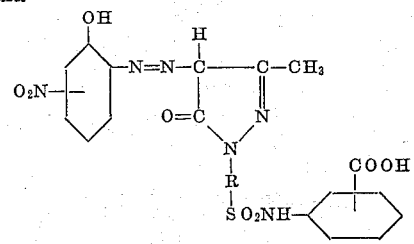

in which R means an unsulfonated radicle of the benzene series, said dyes dyeing wool in the presence of a chromium mordant red tints of good fastness.

4. The dye which corresponds to the formula

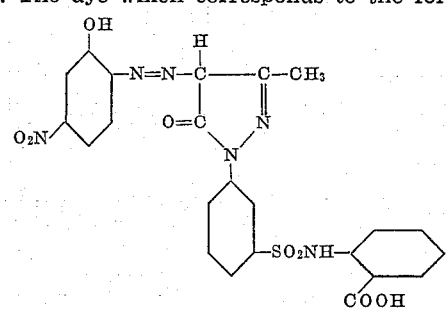

said dye dyeing wool in the presence of a chromium mordant red tints of good fastness.

5. The process which comprises diazotizing an amine of the general formula

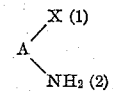

in which A is an unsulfonated radicle of the benzene series and X is a member of the group consisting of OH and —COOH, and coupling the diazo compound with a pyrazolone of the general formula

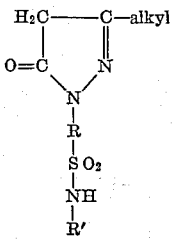

in which R and R' each are an unsulfonated radicle of the benzene series, one of which bears a —COOH-group.

6. The process which comprises diazotizing an unsulfonated orthohydroxyamino compound of the benzene series, and coupling the diazo compound with a pyrazolone of the general formula

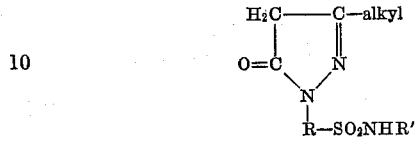

is which R and R' each is an unsulfonated radicle of the benzene series, one of which bears a —COOH-group.

7. The process which comprises diazotizing a nitroorthohydroxyaminobenzene and coupling the diazo component with the pyrazolone of the formula

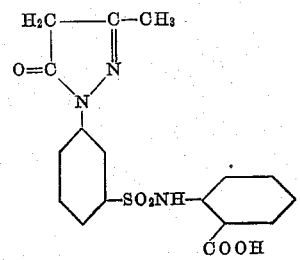

WALTHER BENADE.
ERICH FISCHER.
MAX RAECK.